April 13, 1954 J. H. O'BRIEN 2,674,905
POWER TRANSMISSION MECHANISM
Filed April 1, 1948 2 Sheets-Sheet 1
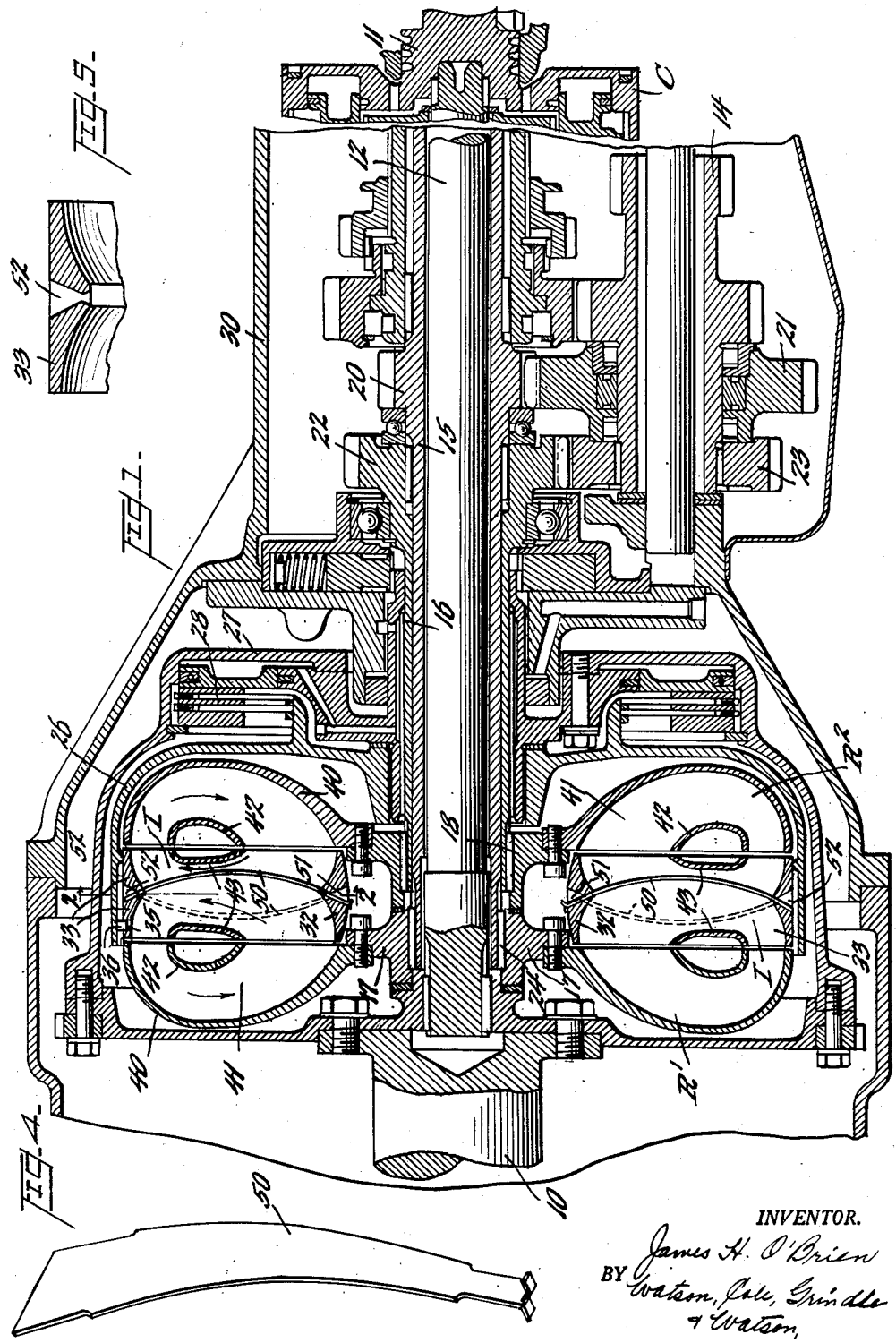
INVENTOR.
James H. O'Brien
BY Watson, Cole, Grindle
& Watson,
Attorneys

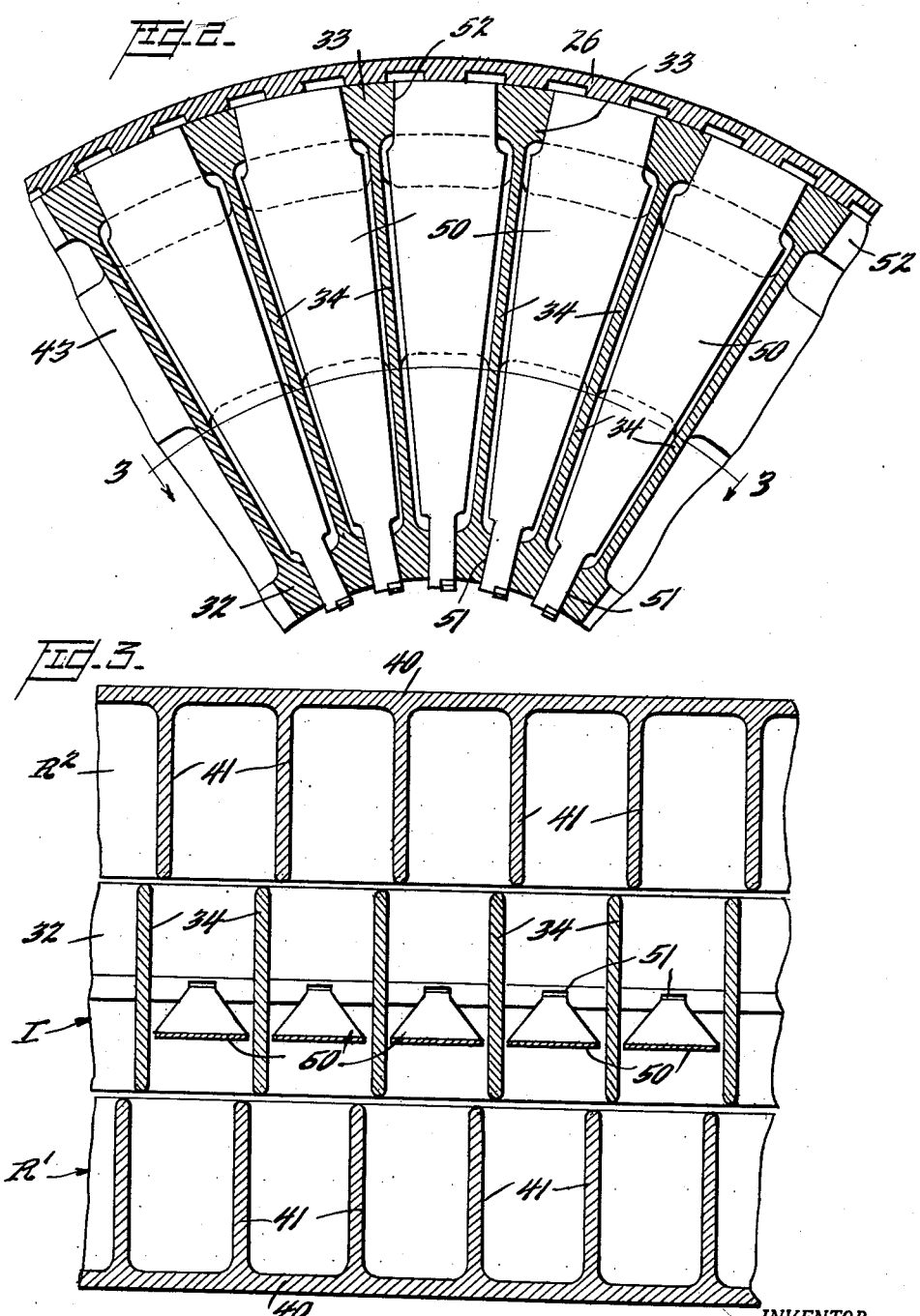

Patented Apr. 13, 1954

2,674,905

UNITED STATES PATENT OFFICE 2,674,905

POWER TRANSMISSION MECHANISM

James H. O'Brien, Detroit, Mich., assignor to Packard Motor Car Company, Detroit, Mich., a corporation of Michigan Application April 1, 1948, Serial No. 18,394

21 Claims. (Cl. 74—730)

The present invention relates to power transmission mechanisms and particularly to a power transmission mechanism adapted to be interposed between, and to operatively connect, the power plant of a motor vehicle and its driving wheels.

It has heretofore been proposed that a fluid coupling may advantageously be included in such a transmission to automatically couple the drive shaft to the work shaft or tail shaft through gearings of different ratios, the driving connection being first made through the gearing of highest ratio and, as the work or tail shaft accelerates, through gearings of progressively lower ratio, reversal of this procedure occurring when the work shaft meets with increasing resistance and decelerates for that reason. While such transmissions, equipped with automatically operating fluid couplings, have been employed with success, it has been found that, because of the nature of the fluid couplings which have heretofore been utilized, the automatic shift from higher gear ratio to lower gear ratio tends to occur prematurely with the result that the power plant is often placed for a short interval of time under too great a load and the overall time required for the acceleration of the work shaft is lengthened. The transmission mechanism of the present invention is, by reason of the inclusion therein of a novel and improved fluid coupling, superior in action to those which have heretofore been suggested or used, having the capacity to accelerate the work shaft more smoothly and in less time than has heretofore been possible under identical operating conditions. The improved transmission is particularly helpful when applied to motor vehicles due to the fact that the imposed loads vary so widely and the power plant is so frequently called upon to accelerate the vehicle. It will be understood, however, that the novel transmission is of general utility and likewise that the fluid coupling may be included in power transmission mechanisms which vary widely in details of construction and in the uses to which they are put.

A fluid coupling which embodies the present invention includes a fluid tight casing, first and second speed runners or turbines and an impeller so positioned with respect to the runners that, when it is in operation, it will deliver energized fluid to both turbines. The impeller is unique in that it embodies means which causes it to automatically apportion the energized fluid which it delivers between the two turbines or runners in accordance with their needs. Thus it includes elements which are displaceable in accordance with variations in pressure of fluids upon opposite sides of the impeller, these elements comprising fluid flow directing members and having the capacity to cause the larger share of the energized fluid delivered by the impeller to be directed toward and against the (first) runner upon one side of the impeller, so long as the pressure of the fluid upon the opposite side of the impeller is less than a predetermined pressure and, when the fluid pressure on that side of the impeller exceeds such predetermined value, to then direct the greater amount of the delivered fluid toward the second runner and reduce the amount delivered to the first runner.

The invention thus comprises a coupling having the capacity to direct the major portion of its output toward that runner which should be then receiving the greatest amount of applied torque and the capacity to automatically cut down the flow to that runner as its torque requirements fall off and then direct the major amount of delivered liquid toward and against the second runner, where it is needed. The arrangement is such that the fluid flow controlling elements mounted upon the impeller move progressively, and not abruptly, so that the action is smooth. The elements are so formed that the greater share of the energy of the fluid delivered by the impeller is applied to the first speed runner for a period of time which is greater than that during which such flow would otherwise occur, and the delivery of energizing fluid in large amount to the second speed runner is delayed. As a result the work shaft of the transmission mechanism to which the fluid coupling may be applied will be accelerated more uniformly and in less time, under a given load, a further advantage being reduction of wear and tear on the power plant.

The displaceable fluid flow controlling elements carried by the impeller, and which are displaced automatically to effect the aforesaid changes in volume of fluid flow, are preferably resilient metal members the oppositely facing surfaces of which are exposed to contact of the fluid bodies upon opposite sides of the impeller. Fluid pressures upon opposite sides of the impeller will vary from instant to instant during the operation of the coupling and it is found that variation in the amount of slip between the impeller and the two immediately adjacent runners is a principal cause of such pressure variations. Thus the fluid pressure against a displaceable element carried by the impeller will be greatest on that side of the impeller on which the slip between impeller and runner is greatest. Each displaceable element of the impeller will, therefore, be normally urged to move, when the impeller is first rotated, in the direction of that runner which is connected to the work shaft through the gearing of highest ratio, the amount of slip being greatest between the impeller and the runner which is connected to the work shaft through gearing of smaller ratio. To ensure that the major portion of the energy of the fluid energized by the impeller is directed toward the first speed runner for the desired period of time, the flexible fluid directing elements carried by the impeller are designed to initially resist movement under the influence of such a pressure differential until such movement is in order, thus ensuring application of torque to the first speed runner for the desired interval of time.

In its details of construction the improved fluid coupling may vary widely without departure from the invention. One such coupling is shown, in the accompanying drawings, in combination with certain features of a power transmission mechanism and this coupling and the associated elements of the transmission will be described in detail.

In the drawings:

Figure 1 is a longitudinal section through portion of a power transmission mechanism embodying the invention, this mechanism being primarily intended for use as a motor vehicle transmission;

Figure 2 is a section on line 2—2 of Figure 1;

Figure 3 is a section on line 3—3 of Figure 2;

Figure 4 is a perspective view of one of the fluid directing displaceable elements carried by the impeller; and Figure 5 is a section through portion of the impeller, as the impeller is seen in Figure 1, upon a somewhat larger scale.

The drive shaft of the transmission is indicated at 10 and portion of a work or tail shaft is indicated at 11. The drive shaft may, for instance, be connected to the prime mover of a motor vehicle and the tail shaft to wheels to be driven although, as indicated, the transmission may be otherwise employed. For direct drive the shaft 10 transmits its torque to the work shaft 11 through the central coaxial solid shaft 12, any suitable clutch means, such as that partially shown and indicated at C, being employed to effect this direct driving connection. When the drive is direct the fluid coupling is inactive, being unclutched from the drive shaft in a manner hereinafter to be explained. When the work shaft is to be accelerated from a position of rest, however, or when it is decelerating and the clutch connecting shafts 11 and 12 is inactive, the connection between the drive and work shafts will be through a countershaft 14 of conventional nature disposed below and parallel to shaft 12, and through gearing and the fluid coupling which are to be described.

Encircling shaft 12 and concentric therewith are the first and second driven shafts 15 and 16, these shafts essentially comprising relatively rotatable sleeves the the outermost of which is supported in bearings in a conventional manner. Upon one end of the inner driven shaft 15 is fixed the hub 17 of the first speed runner of the fluid coupling, which runner is generally indicated at R' and keyed or otherwise fixed upon the corresponding end of the outer driven shaft 16 is the hub 18 of the second speed runner of the fluid coupling, generally indicated at R². The inner driven shaft 15 is connected to the countershaft 14 by gears 20 and 21 mounted upon these shafts, respectively, having a ratio of 3 to 1, and the outer driven shaft 16 is operatively connected to the countershaft 14 through gears 22 and 23, this driving connection being of lower ratio than that first described. The driving connections between runners R' and R² of the fluid coupling and countershaft 14 are more or less conventional and need not be described in detail. An overrunning clutch is interposed between gear 21 and the countershaft 14 upon which it is mounted so that the first speed runner R' will be disconnected from shaft 14 when that shaft is driven from the second speed runner R².

The impeller I is mounted upon and rotatable with an impeller supporting shell 26 which is mounted for rotation about the common axis of shafts 15 and 16 and is adapted to be connected to or disconnected from the fluid tight casing 27 of the coupling by means of a starting clutch 28 of known character. The fluid tight casing 27 is rigidly attached to the end of the crank or drive shaft 10 and is rotatable therewith, carrying the impeller. The whole is enclosed within a stationary housing 30 of conventional character.

It will be observed that the impeller I comprises essentially inner and outer concentric generally cylindrical members 32 and 33 respectively, these members being rigidly connected by flat radially extending blades 34 disposed in planes which pass through the common axis of shafts 15 and 16, the blades and inner and outer generally cylindrical members 32 and 33 thus defining a circular series of fluid receiving cells or passages extending transversely through the impeller, these cells flaring outwardly in transverse section as shown clearly in Figure 2. Within the import of the invention the liquid receiving cells of the impeller may be otherwise formed but an impeller constructed in the manner shown will be effective in operation and well able to withstand the strains to which it will be subjected in use. The outer cylindrical member 33 of the impeller is provided with recesses or apertures 35 to receive pins 36 projecting radially inwardly from the carrier shell 26, the impeller being thus constrained to rotate with the carrier shell at all times.

The first and second speed runners R' and R² are similarly formed, each comprising a toroidal shell or outer shroud 40 having spaced blades 41 disposed in radial planes passing through the common axis of the inner and outer driven shafts 15 and 16, and an inner shroud 42 which is complementary to a shroud 43 which forms portion of the impeller I. Preferably the relationship of impeller to runners R' and R² is as illustrated, the opposing faces of the impeller being disposed in parallel planes and the adjacent faces of the runners being disposed in close relationship to those planes. It will be appreciated by one skilled in the art, however, that the impeller and runners may be substantially varied in detail provided that the arrangement is such that the impeller will adequately deliver energized fluid to both runners when the impeller is actuated.

Each of the transverse fluid receiving passages of the impeller is divided by a flexible element or wall 50 into two spaces. The flexible wall elements 50 are resilient and each preferably comprises a strip of sheet metal the ends of which are received in slots especially formed for their reception in the inner and outer annular members 32 and 33 of the impeller. The inner end of each element 50 passes into and through a slot 51 formed in the inner cylindrical member 32 and the outer end of each element into and through a slot 52 formed in the outer cylindrical member 33 of the impeller, the slots 51 and 52 flaring as shown so that the flexible wall 50, which normally occupies the position in which it is shown in full lines in Figure 1, may be flexed from such position, under the influence of fluid pressure, to the position in which it is shown in dotted lines in the same figure. The outer end of each flexible element 50 rests against an inwardly facing surface of shell 26 as shown in Figures 1 and 2, so that the flexible wall is prevented from moving outwardly as the impeller rotates.

It will be observed from an inspection of Figure 2 that each of the elements 50 is slightly narrower than the impeller passage in which it is positioned so that fluid may pass around its edges from one face to the other. The flexible wall elements 50 are, however, of such area, and have such flexibility, that they will be deflected or distorted from one extreme position to the other when the pressures of the bodies of fluid upon the opposite faces thereof vary within the normal range of variations of fluid pressures which customarily occur during the operation of the device.

When the several elements 50 are in the positions in which they are shown in full lines in Figure 1, and the impeller is first revolved, the fluid within the cavity defined by the runners and impeller will be caused to flow in the directions indicated by the arrows drawn in solid lines and it will be observed that the volume of energized fluid which is delivered by the impeller will be apportioned between the two runners, the major portion of the energized fluid being directed toward and against the first speed runner R' and the minor portion of the energized fluid being directed toward and against the second speed runner R². The energy of the fluid is principally directed, therefore, in the delivery of the starting torque, to the first speed runner R' and the amount of liquid and liquid delivered energy transmitted to the second speed runner R² is very considerably less.

However, because of the fact that the first speed runner is connected to the work shaft II through gearing having a higher ratio than the gearing which is interposed between the second speed runner R² and the work shaft, the first speed runner R' will revolve more rapidly than the second speed runner R² and, for this reason, the extent of the slip between the impeller and the second speed runner R² will be greater than the extent of the slip between the impeller and the first speed runner R'. As the fluid pressure varies in magnitude with the slip the pressure of the liquid upon the initially convex side of each of the flexible division plates 50 will be greater than the pressure of the liquid against its initially concave side and, due to such unbalanced liquid pressures upon the opposite faces of the division plates, they will be gradually deflected, this deflection occurring progressively and becoming full and complete (to dotted line position in Figure 1) when the pressure upon the second speed runner side has become substantially greater than the pressure upon the first speed runner side.

After the vehicle has been accelerated sufficiently the drive shaft may be directly connected to the work or tail shaft and the fluid coupling will no longer be active in transmitting torque. The runners R' and R² will then both rotate substantially at the speed of the impeller I and the elements 50 will re-assume the positions in which they are shown in full lines in Figure 1.

It will be appreciated that the pressure responsive, fluid flow directing elements associated with the impeller I may be formed in various ways and that the structure of the impeller as well as the runners R' and R² may be substantially modified without departure from the invention.

Having thus described the invention, what is claimed as new and desired to be secured by Letters Patent is:

1. In a power transmission mechanism, in combination, a work shaft, first and second driven shafts, torque multiplying gearing providing driving connections of different gear ratios between the driven shafts and the work shaft, the connection between the first driven shaft and work shaft having the highest ratio and including an overrunning clutch, a drive shaft, and a fluid coupling connecting the drive shaft and driven shafts, said coupling comprising a fluid tight casing connected to the drive shaft, first and second speed runners within said casing and fixed upon said first and second driven shafts respectively, said runners being spaced apart, and an impeller supported upon said casing and rotatable therewith, said impeller being positioned between and disposed to deliver energized fluid simultaneously to each of said runners from either side of said impeller, respectively.

2. In a power transmission mechanism, in combination, a work shaft, first and second driven shafts, torque multiplying gearing providing driving connections of different gear ratios between the driven shafts and the work shaft, the connection between the first driven shaft and the work shaft having the highest ratio and including an overrunning clutch, a drive shaft, and a fluid coupling connecting the drive shaft and driven shafts, said coupling comprising a fluid tight casing connected to the drive shaft, first and second speed runners within said casing and fixed upon said first and second driven shafts respectively, and an impeller mounted upon said casing intermediately of said first and second runners and rotatable with said casing, said impeller embodying means to simultaneously deliver energizing fluid to each runner from either side of said impeller, respectively when rotation of the drive shaft is initiated, said means first delivering the major proportion of its fluid output to said first speed runner and thereafter to said second speed runner.

3. In a power transmission mechanism, in combination, a work shaft, first and second driven shafts, torque multiplying gearing providing driving connections of different gear ratios between the driven shafts and the work shaft, the connection between the first driven shaft and work shaft having the highest ratio and including an overrunning clutch, a drive shaft, and a fluid coupling connecting the drive shaft and driven shafts, said coupling comprising a fluid tight casing connected to the drive shaft, first and second speed runners within said casing and fixed upon said first and second driven shafts respectively, an impeller rotatable with the casing, said impeller having mounted thereon pressure responsive means for directing the major portion of the fluid delivered thereby to either the first or the second speed runner as the load on the work shaft varies.

4. The combination set forth in claim 3 in which said pressure responsive means includes a member shiftable axially of the impeller.

5. In a power transmission mechanism, in combination, a work shaft, first and second driven shafts, torque multiplying gearing providing driving connections of different gear ratios between the driven shafts and the work shaft, the connection between the first driven shaft and work shaft having the highest ratio and including an overrunning clutch, a drive shaft, and a fluid coupling connecting the drive shaft and driven shafts, said coupling comprising a fluid tight casing connected to the drive shaft, first and second speed runners within said casing and fixed upon said first and second driven shafts respectively, an impeller rotatable with the casing, said impeller having inner and outer concentric generally cylindrical members, fluid energizing blades disposed transversely to the plane of rotation of the impeller and defining, with said inner and outer cylindrical members, a series of recesses extending transversely through the impeller, a resilient plate mounted in each such recess and extending generally in the plane of rotation of the impeller so as to substantially interrupt flow of liquid through that recess from one side of the impeller to the other, said plate being adapted to flex in response to differences in fluid pressure upon its opposite faces, for the purpose set forth.

6. In a power transmission mechanism, the combination with driving and work shafts of torque multiplying gearing providing driving connections of different gear ratios therebetween, said gearing including a fluid coupling having spaced runners and a coaxially mounted intermediate impeller disposed to deliver energized fluid simultaneously to each runner from either side of said impeller, respectively, said impeller embodying axially shiftable means responsive to variations in pressure of the fluid upon opposite sides thereof for varying the volume of liquid which it delivers to the respective runners.

7. In a transmission having a drive shaft, a work shaft, first and second speed driven shafts, torque multiplying gearing providing driving connections of different gear ratios between the driven shafts and the work shaft, the gearing between the first driven shaft and the work shaft having a higher ratio than the gearing between the second driven shaft and the work shaft, an overrunning clutch between the first driven shaft and the work shaft, a fluid coupling having an impeller operably connected to the drive shaft and first and second speed runners operably connected to the first and second speed driven shafts, said impeller comprising a series of fluid impelling passages and fluid pressure responsive members movably supported in said passages to direct the major portion of fluid energized by the impeller to the first speed runner at low coupling speeds and movable progressively in response to variations of fluid pressure caused by variations of slip between the impeller and the first and second speed runners to direct a progressively increasing proportion of the fluid energized by the impeller to the second speed runner as the coupling speed progressively increases.

8. In a fluid coupling, a fluid tight casing adapted to be rotated about an axis, first and second runners within the casing and supported for rotation about said axis, a shaft associated with each runner and arranged to be driven thereby, an impeller mounted upon and rotatable with said casing, said impeller being disposed intermediate said runners and constructed and adapted to deliver driving fluid simultaneously to both runners, and partly axially shiftable pressure responsive means mounted on the impeller for directing the major portion of the fluid delivered thereby to said runners alternately as the loads on said shafts vary.

9. In a power transmission mechanism, in combination, a workshaft, first and second driven shafts, torque multiplying gearing providing driving connections of different gear ratios between the driven shafts and the work shaft, the connection between the first driven shaft and work shaft having the higher gear ratio and including an overrunning clutch, a drive shaft, and a fluid coupling connecting the drive shaft and driven shafts, said coupling comprising first and second speed runners fixed upon said first and second driven shafts respectively, an impeller, means for connecting said impeller with said drive shaft for rotation therewith, said impeller having mounted thereon pressure responsive means for directing the major portion of the fluid delivered thereby to either the first or the second speed runner as the load on the work shaft varies, said pressure responsive means including a member shiftable axially of the impeller.

10. In a power transmission mechanism, in combination, a workshaft, first and second driven shafts, torque multiplying gearing providing driving connections of different gear ratios between the driven shafts and the work shaft, the connection between the first driven shaft and the work shaft having the higher gear ratio and including an overrunning clutch, a drive shaft, and a fluid coupling connecting the drive shaft and driven shafts, said coupling comprising first and second speed runners fixed upon said first and second driven shafts respectively, an impeller positioned intermediately of said first and second speed runners, means for connecting said impeller with said drive shaft for rotation therewith, said impeller having mounted thereon pressure responsive means for directing the major portion of the fluid delivered thereby to either the first or the second speed runner as the load on the work shaft varies, said pressure responsive means including a member shiftable axially of the impeller.

11. In a power transmission mechanism, in combination, a work shaft, first and second driven shafts, torque multiplying gearing providing driving connections of different ratios between the driven shafts and the work shaft, the connection between the first driven shaft and work shaft having the higher ratio and including an overrunning clutch, a drive shaft, and a fluid coupling connecting the drive shaft and the driven shafts, said coupling comprising first and second speed runners fixed upon said first and second driven shafts respectively, an impeller, means for connecting said impeller to said drive shaft for rotation therewith, said impeller having inner and outer concentric generally cylindrical members, fluid energizing blades disposed transversely to the plane of rotation of the impeller and defining, with said inner and outer cylindrical members, a series of passages extending transversely through the impeller, a resilient plate mounted in each such passage and extending generally in the plane of rotation of the impeller so as to substantially interrupt flow of liquid through that passage from one side of the impeller to the other, said plate being adapted to flex in response to differences of fluid pressure upon its opposite faces, for the purpose set forth.

12. In a power transmission mechanism, in combination, a work shaft, first and second driven shafts, torque multiplying gearing providing driving connections of different gear ratios between the driven shafts and the work shaft, the connection between the first driven shaft and work shaft having the higher gear ratio and including an overrunning clutch, a drive shaft, and a fluid coupling connecting the drive shaft and driven shafts, said coupling comprising first and second speed runners fixed upon said first and second driven shafts respectively, an impeller positioned intermediately of said first and second speed runners, means for connecting said impeller to said drive shaft for rotation therewith, said impeller having inner and outer concentric generally cylindrical members, fluid energizing blades disposed transversely to the plane of rotation of the impeller and defining, with said inner and outer cylindrical members, a series of passages extending transversely through the impeller, a resilient plate mounted in each such passage and extending generally in the plane of rotation of the impeller so as to substantially interrupt flow of liquids through that passage from one side of the impeller to the other, said plate being adapted to flex in response to differences of fluid pressure upon its opposite faces, for the purposes set forth.

13. In a transmission having a drive shaft, a work shaft, first and second speed driven shafts, torque multiplying gearing providing driving connections of different gear ratios between the driven shafts and the work shaft, the gearing between the first driven shaft and the work shaft having a higher ratio than the gearing between the second driven shaft and the work shaft, an overrunning clutch between the first driven shaft and the work shaft, a fluid coupling having an impeller operatively connected to the drive shaft and first and second speed runners operably connected to the first and second speed driven shafts, said impeller being positioned intermediately of said first and second speed runners, the combination therewith of fluid pressure actuated means associated with the impeller to direct the major portion of the fluid energized by the impeller to the first speed runner at low coupling speed and movable progressively in response to variations of fluid pressure caused by variations of slip between the impeller and the first and second speed runners to direct a progressively increasing proportion of the fluid energized by the impeller to the second speed runner as the coupling speed progressively increases.

14. In a power transmission mechanism, including a fluid coupling, a drive shaft, an impeller connected to said drive shaft to rotate therewith, a driven shaft, a speed runner mounted on said driven shaft coaxially with said impeller, said impeller being formed with a circular series of axially through-going fluid impelling passages, a flexible plate radially disposed within and extending transversely of each such passage and adapted to flex when the pressure of fluid upon opposite sides of the plate becomes unequal due to variations in slip between said impeller and said runner.

15. In a fluid coupling for transmissions in combination, a rotatable fluid tight casing, coaxial shafts extending through an opening in the wall of said casing, runners within the casing and fixed upon said shafts, respectively, and a coaxially mounted impeller carried by the casing and disposed intermediate two of said runners so as to deliver energized fluid simultaneously at all times to each of said two runners from adjacent sides of said impeller, said impeller having a circular series of axially through-going fluid impelling passages, and fluid pressure responsive members movably supported in said passages so as to determine the volume of energized fluid delivered to the respective runners.

16. In a fluid coupling for transmissions in combination, a rotatable fluid tight casing, coaxial shafts extending through an opening in the wall of said casing, runners within the casing and fixed upon said shafts, respectively, and a coaxially mounted impeller carried by the casing and disposed intermediate two of said runners so as to deliver energized fluid simultaneously at all times to each of said runners from adjacent sides of said impeller, respectively, said impeller having formed therein a plurality of radially diverging axially through-going fluid impelling passages, and a flexible plate radially disposed in each such passage approximately midway between the sides thereof, said plates being adapted to flex when the pressures of the fluids upon opposite sides thereof are unequal.

17. The fluid coupling described in claim 16 in which the impeller is provided with slots at the inner and outer extremities of each such fluid receiving passage for the reception and retention of the ends of the flexible plate positioned in that passage.

18. The fluid coupling set forth in claim 16 in which the flexible plates are initially curved or bowed.

19. An impeller for a fluid coupling comprising coaxially generally cylindrical members and a plurality of radial blades connecting the same and defining with said members a circular series of fluid impelling passages extending axially through the impeller, a plate radially disposed within and extending transversely of each such passage, each plate being constructed and mounted for axial movement, at least in part, when the fluid pressures upon its opposite faces are unbalanced.

20. In a fluid coupling, a combination of spaced runners, a coaxially mounted impeller disposed intermediate said runners and arranged to deliver energized fluid simultaneously at all times to each of said runners from adjacent sides of said impeller, respectively, said impeller being formed with a series of axially through-going fluid impelling passages, and fluid pressure responsive members movably supported in said passages so as to proportion the volume of energized fluid delivered to said runners from the adjacent sides of said impeller, respectively.

21. In a fluid coupling, the combination of spaced runners, a coaxially mounted impeller disposed intermediate said runners and arranged to deliver energized fluid simultaneously at all times to each of said runners from adjacent sides of said impeller, respectively, said impeller being formed with a series of axially through-going fluid impelling passages, and a flexible member disposed in each of said passages and adapted to flex when the pressures of the fluids upon opposite sides thereof are unequal.

References Cited in the file of this patent

UNITED STATES PATENTS

| Number | Name | Date |
|---|---|---|
| 2,005,444 | Weiss | June 18, 1935 |
| 2,055,895 | Fawcett | Sept. 29, 1936 |
| 2,093,498 | Walti | Sept. 21, 1937 |
| 2,171,782 | Cotterman | Sept. 5, 1939 |
| 2,267,476 | Patterson | Dec. 23, 1941 |
| 2,385,059 | Buthe | Sept. 18, 1945 |
| 2,488,478 | Roberts | Nov. 15, 1949 |
| 2,536,842 | Duffield | Jan. 2, 1951 |